(12) United States Patent
Yamamura et al.

(10) Patent No.: US 9,740,204 B2
(45) Date of Patent: Aug. 22, 2017

(54) CONTROL APPARATUS FOR AUTONOMOUSLY NAVIGATING UTILITY VEHICLE

(71) Applicant: Honda Motor Co., Ltd., Tokyo (JP)

(72) Inventors: Makoto Yamamura, Wako (JP); Hideaki Shimamura, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/080,284

(22) Filed: Mar. 24, 2016

(65) Prior Publication Data

US 2016/0282870 A1    Sep. 29, 2016

(30) Foreign Application Priority Data

Mar. 27, 2015    (JP) .................................. 2015-067220

(51) Int. Cl.
  *G05D 1/00* (2006.01)
  *A01D 34/00* (2006.01)
  *G05D 1/02* (2006.01)

(52) U.S. Cl.
  CPC ......... *G05D 1/0088* (2013.01); *A01D 34/008* (2013.01); *G05D 1/0225* (2013.01); *G05D 1/0265* (2013.01); *G05D 1/0272* (2013.01); *G05D 1/0274* (2013.01); *G05D 2201/0208* (2013.01)

(58) Field of Classification Search
  None
  See application file for complete search history.

(56) References Cited

U.S. PATENT DOCUMENTS

| | | | |
|---|---|---|---|
| 7,206,677 B2 | 4/2007 | Huldén | |
| 2014/0121876 A1* | 5/2014 | Chen | G05D 1/0219 701/22 |
| 2016/0062358 A1* | 3/2016 | Nakayama | G01D 5/2006 701/23 |
| 2016/0062361 A1* | 3/2016 | Nakano | G05D 1/024 701/25 |
| 2016/0231749 A1* | 8/2016 | Shimamura | G05D 1/0265 |

FOREIGN PATENT DOCUMENTS

JP    2013164742 A    8/2013

* cited by examiner

*Primary Examiner* — Redhwan K Mawari
*Assistant Examiner* — Edward Torchinsky
(74) *Attorney, Agent, or Firm* — Duft Bornsen & Fettig LLP

(57) ABSTRACT

In an apparatus for controlling operation of an autonomously navigating utility vehicle to travel about a working area, there are provided a cell memorizing unit identifying a series of cells on which the vehicle has traveled in the work mode, assigning cell numbers successively to the series of cells, and memorizing the series of cells in association with the assigned cell numbers, the series of cells starting from the charging device to the current cell of the vehicle, a cell selecting unit selecting a return locus cell from among the series of cells in the return mode, the return locus cell being adjacent to the current cell, a cell number of the return locus cell being smaller than a cell number of the current cell, and a travel controlling unit controlling the vehicle to travel on the return locus cell to return to the charging device.

8 Claims, 11 Drawing Sheets

CONTROL APPARATUS FOR AUTONOMOUSLY NAVIGATING UTILITY VEHICLE

CROSS-REFERENCE TO RELATED APPLICATION

This application is based upon and claims the benefit of priority from Japanese Patent Application No. 2015-067220 filed on Mar. 27, 2015, the contents of which are incorporated herein by reference.

BACKGROUND OF THE INVENTION

Field of the Invention

This invention relates to a control apparatus for an autonomous navigating utility vehicle that autonomously navigates and performs lawn mowing and/or other tasks in a working area.

Description of Related Art

Control apparatuses are known that control an autonomously navigating utility vehicle equipped with electric motors and a battery so as to perform a task while autonomously traveling in a working area delineated by a boundary wire as taught by Japanese Laid-Open Patent Application No. 2013-164742, for example. When the battery requires charging, the control apparatus described in this reference returns the utility vehicle to a charging station by driving it along the boundary wire on the basis of detection values from magnetic sensors.

However, the driving of the utility vehicle along the boundary wire by the control apparatus described in the reference tends to produce ruts because frequency of passage along the same paths is high. Moreover, a path to a charging station becomes long, making it difficult to achieve efficient return operation of the utility vehicle.

SUMMARY OF THE INVENTION

According to an aspect of the present invention, there is provided an apparatus for controlling operation of an autonomously navigating utility vehicle equipped with a prime mover powered by a battery to travel about a working area in order to perform work autonomously, comprising: a position detector that is configured to detect a position of the vehicle on a map of the working area that is divided into an array of a plurality of cells; and an electronic control unit having a CPU and memory; wherein the CPU is configured to function as: a map generating unit that is configured to generate a map of the working area that is divided into an array of a plurality of cells; a mode switching unit that is configured to switch operating mode between work mode for making the vehicle autonomously travel and perform work in the working area and return mode for making the vehicle return to a charging device located at the working area in order to charge the battery; a cell memorizing unit that is configured to identify a series of cells on which the vehicle has traveled in the work mode from among the plurality of cells based on the position of the vehicle detected by the position detector, assign cell numbers successively to the series of cells, and memorize the series of cells in association with the assigned cell numbers, the series of cells starting from a starting cell at or around a location of the charging device to a current cell at which the position of the vehicle is detected by the position detector; a cell selecting unit that is configured to successively select a cell for a return locus along which the vehicle is to move from the current cell from among the series of cells memorized by the cell memorizing unit, when the operating mode is switched from the work mode to the return mode by the mode switching unit, the cell for the return locus being adjacent to the current cell, a cell number of the cell for the return locus being smaller than a cell number of the current cell; and a travel controlling unit that is configured to control operation of the prime mover to make the vehicle travel along the cell for the return locus successively selected by the cell selecting unit to return to the charging device such that the cell number of the cell for the return locus decreases as the vehicle moves.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
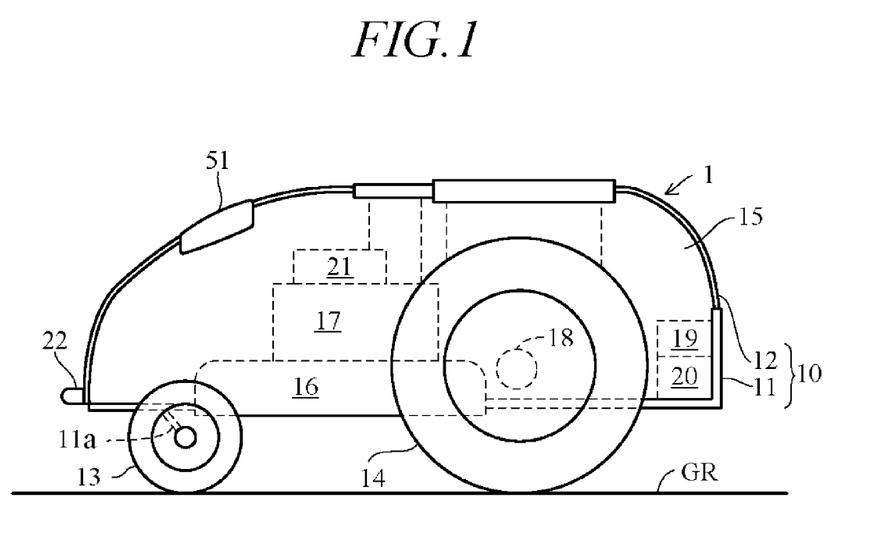
FIG. 1 is a side view schematically illustrating configuration of an autonomously navigating utility vehicle according to an embodiment of this invention.

An embodiment of the present invention is explained with reference to FIGS. 1 to 14 in the following. FIG. 1 is a side view schematically illustrating the configuration of an autonomously navigating utility vehicle according to an embodiment of the present invention, and FIG. 2 is plan view of the same.

The autonomously navigating utility vehicle of the present invention can be embodied in the form of various types of utility vehicle and particularly as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

Figure 2:
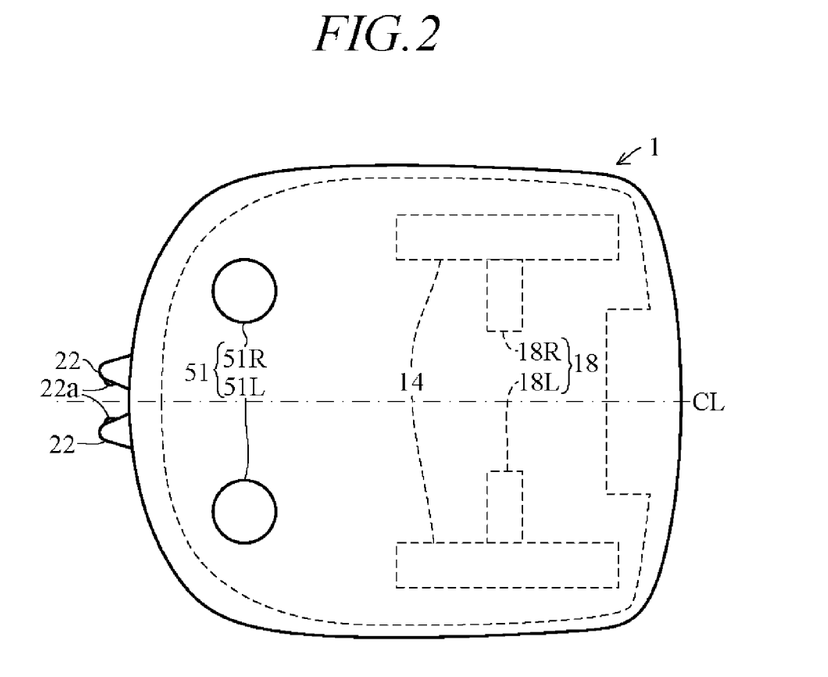
FIG. 2 is a plan view schematically illustrating the configuration of the utility vehicle according to the embodiment.

As shown in FIGS. 1 and 2, an autonomously navigating utility vehicle (hereinafter called simply "vehicle") 1 is equipped with a body 10 having a chassis 11 and a frame 12, along with a pair of left and right front wheels 13 and a pair of left and right rear wheels 14 that support the body 10 above a ground surface GR so as to be capable of travel.

The front wheels 13 are rotatably fastened through stays 11a to the front end of the chassis 11. The rear wheels 14, which are greater in diameter than the front wheels 13, are rotatably fastened directly to the rear end of the chassis 11. The weight and size of the vehicle 1 are such that it can be transported by an operator. As an example can be cited a vehicle 1 whose total length (forward-rearward direction length) is about 500 mm, total width about 300 mm, and height about 300 mm.

A work unit 16, a work motor 17 for driving the work unit 16, travel motors (prime mover) 18 for driving the rear wheels 14, a battery charging unit 19 and a battery (secondary battery) 20 are deployed in an internal space 15 of the vehicle 1 enclosed by the chassis 11 and the frame 12.

The work unit 16 comprises a rotor and blades attached to the rotor and has a substantially disk-like shape as a whole. A rotating shaft is installed vertically at the center of the rotor and the work unit 16 is configured to enable adjustment of the height of the blades above the ground GR through a height regulating mechanism 21 by the operator. The height regulating mechanism 21 is equipped with, for example, a screw operable by the operator. The work motor 17 is constituted by an electric motor installed above the work unit 16, and an output shaft thereof is connected to the rotating shaft of the rotor to rotate the blades unitarily with the rotor.

The travel motors 18 comprise a pair of electric motors 18L and 18R installed on the right and left inner sides of the left and right rear wheels 14. Output shafts of the travel motors 18L and 18R are connected to rotating shafts of the left and right rear wheels 14, respectively, so as each to independently drive or rotate the left or right rear wheel 14. In other words, the vehicle 1 comprises the front wheels 13 as non-driven free wheels and the rear wheels 14 as driving wheels, and the travel motors 18L and 18R each independently rotates one of the rear wheels 14 normally (rotation to move forward) or reversely (rotation to move reverse). By establishing a difference between the rotating speeds of the left and right rear wheels 14, the vehicle 1 can be turned to an arbitrary direction.

For example, when the left and right rear wheels 14 are both rotated normally and the rotational speed of the right rear wheel 14 is greater than the rotational speed of the left rear wheel 14, the vehicle 1 turns left at a turning angle θ in accordance with the speed difference. Conversely, when the rotational speed of the left rear wheel 14 is greater than the rotational speed of the right rear wheel 14, the vehicle 1 turns right at a turning angle θ in accordance with the speed difference. When one of the left and right rear wheels 14 is rotated normally and the other reversely both at the same speed, the vehicle 1 turns on the spot.

The charging unit 19, which includes an AC-DC converter, is connected by wires to charging terminals 22 provided at the front end of the frame 12 and is also connected by wires to the battery 20. The charging terminals 22 have contacts 22a, and the battery 20 can be charged by connecting the charging terminals 22 through the contacts 22a to a charging station 3 (charging device, see FIG. 5). The battery 20 is connected through wires to the work motor 17 and the travel motors 18, and the work motor 17 and the travel motors 18 are driven by power supplied from the battery 20 through drivers.

Figure 3:
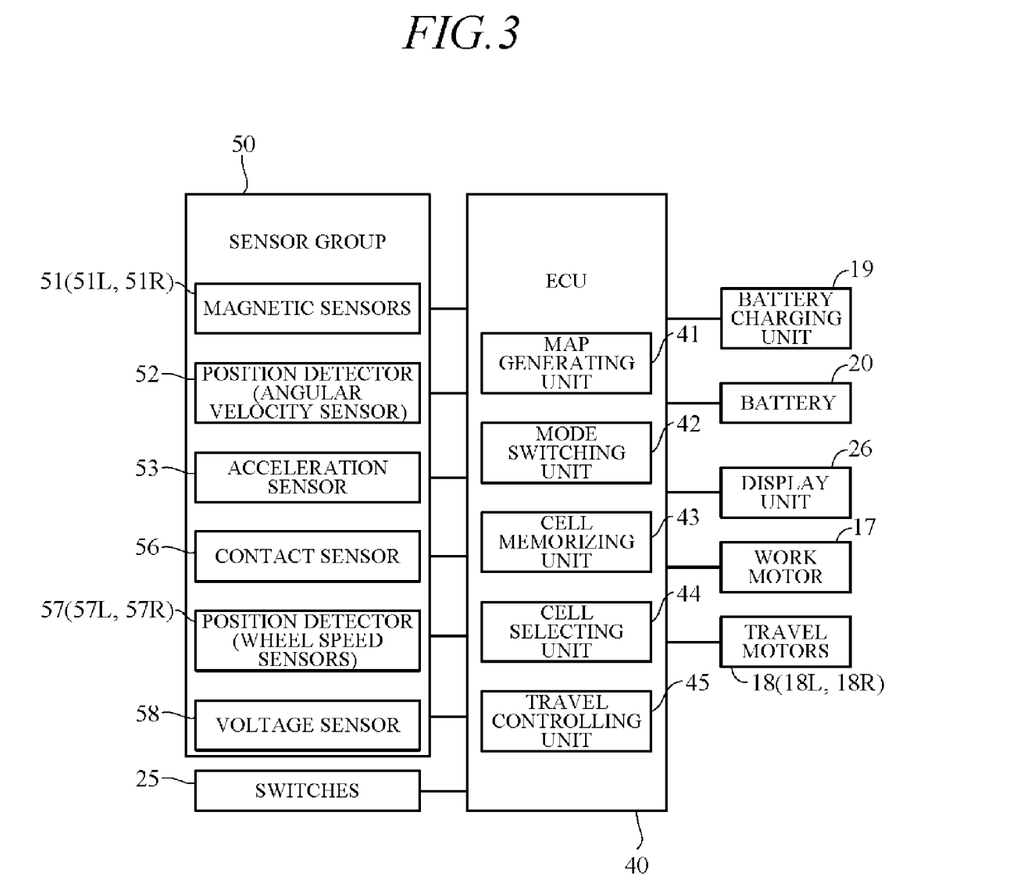
FIG. 3 is a block diagram showing the configuration of the control apparatus of the vehicle according to the present embodiment including an ECU.

FIG. 3 is a block diagram showing the configuration of the control apparatus of the vehicle 1 according to the present embodiment. As shown in FIG. 3, an Electronic Control Unit (ECU) 40 is mounted on the vehicle 1. The ECU 40 has a microcomputer of a configuration including an arithmetic processing unit (CPU) and memories ROM, RAM and other peripheral circuits.

The ECU 40 is connected with a group of sensors collectively designated by reference numeral 50 that detects various conditions of the vehicle 1, charging unit 19, battery 20, a group of switches 25, display unit 26, work motor 17 and travels motors 18 (18R, 18L). The group of sensors 50 includes a pair of magnetic sensors 51 (51R, 51L), an angular velocity sensor (turning angle sensor) 52, an acceleration sensor 53, an orientation sensor 54, a position sensor, a contact sensor 56, a pair of wheel speed sensors 57 (57R, 57L), and a voltage sensor 58.

The magnetic sensors 51, i.e., 51R and 51L are installed laterally spaced apart on the front end of the vehicle 1. More specifically, as shown in FIG. 2, the magnetic sensors 51R and 51L are installed laterally symmetrically with respect to a center line CL running in the straight forward direction along the widthwise center of the vehicle 1. The magnetic sensors 51 produces an output indicating magnitude of magnetic field (magnetic field strength (intensity) H).

The angular velocity sensor 52 produces an output indicating angular velocity (yaw rate) occurring at the vehicle 1 around a height direction (z-axis) of the vehicle 1, from which a turning angle θ of the vehicle 1 around the z-axis can be calculated.

The acceleration sensor 53 produces an output indicating acceleration acting on the vehicle 1 in the directions of three orthogonal axes (x-axis, y-axis, and z-axis).

The contact sensor 56 produces an output of ON signal when the frame 12 is detached from the chassis 11 owing to contact with an obstacle or the like. Each of the pair of wheel speed sensors 57R, 57L produces an output indicating wheel speed of one of the left and right rear wheels 14, from which a travel distance of the vehicle 1 can be calculated. The voltage sensor 58 produces an output indicating a residual voltage of the battery 20.

The switches 25 has various switches provided to be manipulatable by the operator and includes a main switch for inputting various commands, inter alia, start of vehicle 1 operation, and an emergency stop switch for stopping the vehicle 1 in an emergency.

The display unit 26 has a display that shows various information to be supplied to the operator. The switches 25 and display unit 26 may be constituted by a touch panel.

Figure 4:
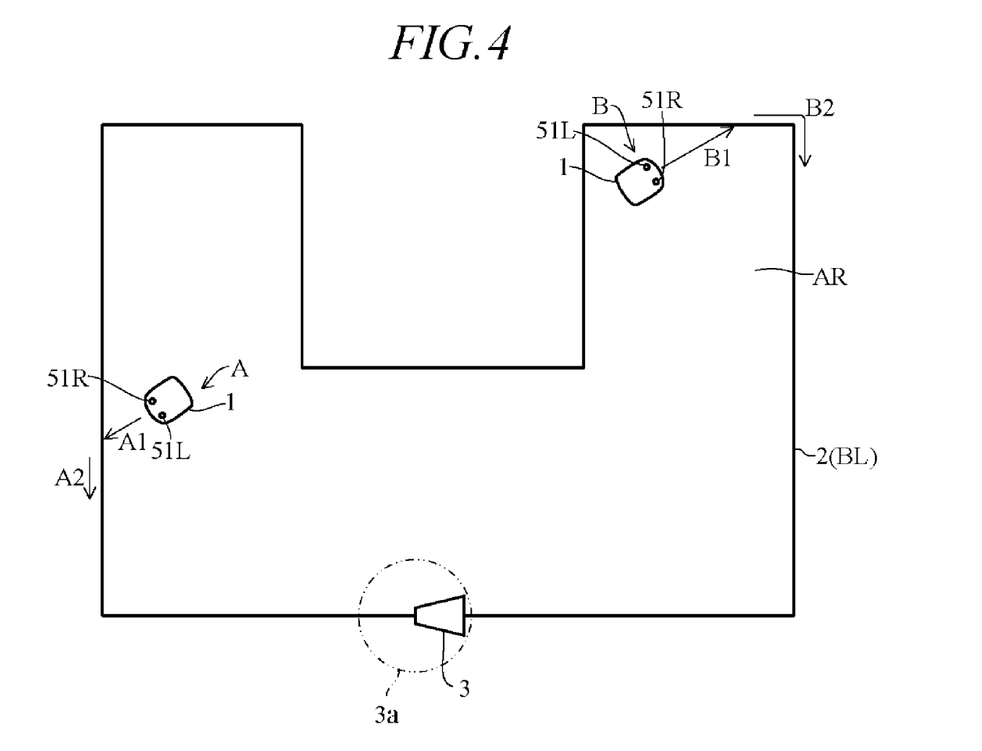
FIG. 4 is a diagram showing an example of a working area.

The vehicle 1 configured as described above performs a task while autonomously navigating within a predefined working area. FIG. 4 is a diagram showing an example of a working area AR. The working area AR is, for example, delineated by a boundary wire 2 that constitutes a boundary line (L0) and is laid beforehand (e.g., buried a predetermined depth under the ground surface GR). A magnetic field is generated in the working area AR by passing electric current through the boundary wire 2. The charging station 3 for charging the battery 20 is situated above the boundary wire 2. The working area AR defines the travel range of the vehicle 1 and may include not only area(s) to be serviced but also area(s) not to be serviced.

Figure 5:
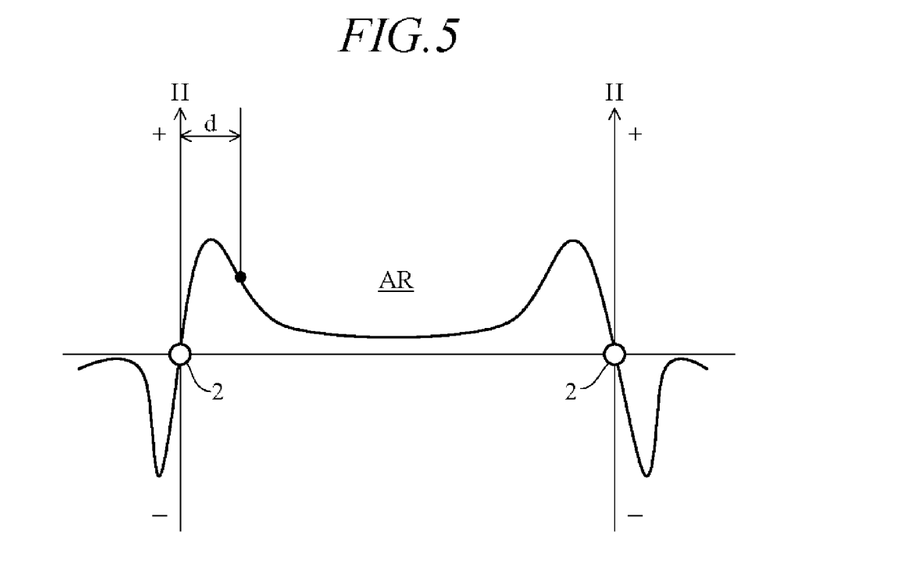
FIG. 5 is a diagram showing relation between distance from the boundary wire and magnetic field strength.
Figure 6:
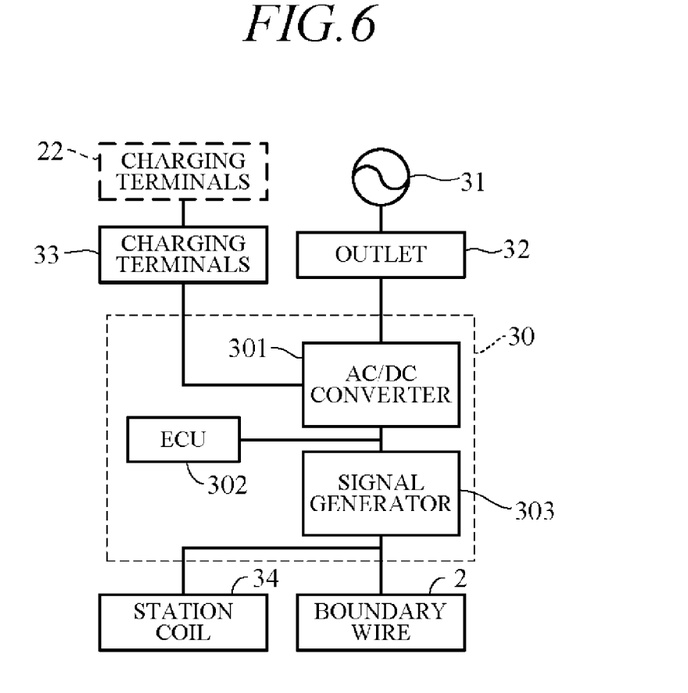
FIG. 6 is a block diagram showing a configuration of the charging station installed on the boundary wire of FIG. 4.

FIG. 5 is a diagram showing relation between distance d from the boundary wire 2 and magnetic field strength H. As indicated in FIG. 6, magnetic field strength H varies with distance d from the boundary wire 2. Specifically, magnetic field strength H is 0 above the boundary wire 2, positive inside the working area AR, and negative outside the same. When work is in progress, the ECU 40 reads outputs of the magnetic sensors 51L and 51R, and when the output is minus, turns the vehicle 1 toward inside the working area AR at a random angle based on, for example, the output of the angular velocity sensor 52. As a result, work can be carried out inside the working area AR while the vehicle 1 is being driven (forward at random, for example).

FIG. 6 is a block diagram showing a configuration of the charging station 3 installed on the boundary wire 2. As shown in FIG. 6, the charging station 3 has a charger 30 connected through an outlet 32 to a commercial power supply 31, and terminals 33 and a station coil 34 connected to the charger 30. The charger 30 has an AC/DC converter 301, an ECU (electronic control unit) 302 that controls operation of the AC/DC converter 301, and a signal generator 303 that applies alternating current to the boundary wire 2 and station coil 34 to generate signals.

Alternating current from the commercial power supply 31 is converted to direct current and is stepped down to a suitable voltage by the AC/DC converter 301. When the vehicle 1 returns to the charging station 3 and the contacts 22a of the terminals 22 of the vehicle 1 connect with the terminals 33, power stepped-down by the AC/DC converter 301 is supplied to the vehicle 1 to charge the battery 20. The station coil 34 is installed on the charging station 3 and a magnetic field is generated by current passing through the station coil 34. As shown in FIG. 4, this magnetic field forms a charger detection zone 3a within a circle of about 1 m radius centered on the charging station 3. Entry of the vehicle 1 into the charger detection zone 3a is detected from the output of the magnetic sensors 51.

In the present embodiment, the vehicle 1 operates in work mode, trace mode and return mode in response to control commands sent from the ECU 40 in accordance with programs prepared beforehand and memorized in the memory (ROM). In work mode, the vehicle 1 works (mows lawn or grass) while autonomously navigating in the working area AR. In return mode, the vehicle 1 is returned to the charging station 3 when the battery 20 requires charging. In trace mode, the vehicle 1 is driven along the boundary wire 2. Trace mode is executed before work mode to ascertain the working area AR.

Figure 7:
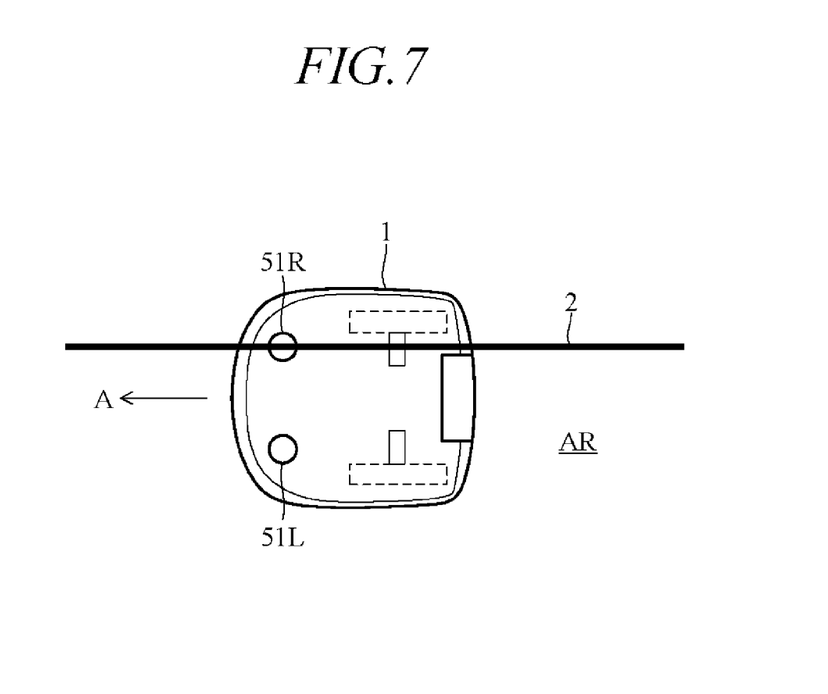
FIG. 7 is a diagram showing operation of the utility vehicle in trace mode.

FIG. 7 is a diagram showing operation of the vehicle 1 in trace mode. As shown in FIG. 7, in trace mode the vehicle 1 is driven by commands from the ECU 40 to circuit along the boundary wire 2 with one of the pair of magnetic sensors 51R and 51L (e.g., 51L) positioned inside the boundary wire 2 and so that the other magnetic sensor (e.g., 51R) moves above the boundary wire 2 in the direction of arrow A. Specifically, the ECU 40 monitors output of the magnetic sensor 51R and controls operation of the travel motors 18L and 18R so that magnetic field strength H detected by the magnetic sensor 51R stays at 0.

For example, when magnetic field strength H detected from the output of the magnetic sensor 51R becomes positive, the vehicle 1 is turned rightward by decelerating right travel motor 18R and accelerating left travel motor 18L. On the other hand, when magnetic field strength H detected from the output of the magnetic sensor 51R becomes negative, the vehicle 1 is turned leftward by accelerating the right travel motor 18R and decelerating the left travel motor 18L. As a result, the right magnetic sensor 51R is brought near the boundary wire 2 and magnetic field strength H detected by the right magnetic sensor 51R is maintained at 0.

Trace mode is started from a state in which the terminals 22 of the vehicle 1 are connected to the terminals 33 of the charging station 3 and ends when the terminals 22 again connect to the terminals 33 after the vehicle 1 makes a circuit along the boundary wire 2. A turning angle θ of the vehicle 1 at trace mode can be acquired by time-integrating the angular velocity detected from the output of the angular velocity sensor 52. A travel distance L of the vehicle 1 can be obtained by time-integrating the wheel speed detected from the output of the wheel speed sensor 57. Based on the turning angle θ and travel distance L, the ECU 40 identifies a boundary line BL of the working area AR (in FIG. 4).

As regards return mode, if the vehicle 1 is trace-driven along the boundary wire 2, it can be returned to the charging station 3 constituting the target position. For example, the vehicle 1 at position A in FIG. 4 is driven straight forward as indicated by arrow A1, turned toward the charging station 3 upon arriving at the boundary wire 2, and driven along the boundary wire 2 as indicated by arrow A2. Or the vehicle 1 at position B in FIG. 4 is driven straight forward as indicated by arrow B1, turned toward the charging station 3 upon arriving at the boundary wire 2, and driven along the boundary wire 2 as indicate by arrow B2. As a result, the vehicle 1 can be returned to the charging station 3 on the boundary wire 2.

However, when the vehicle 1 is returned by trace-driving, distance traveled during return becomes long. As a result, time required for return increases and working efficiency declines. Moreover, the vehicle 1 passes along the same route (above the boundary wire 2) during every return, so that ruts tend to form along the boundary wire 2. Therefore, the control apparatus according to the present embodiment is configured as follows in order to prevent occurrence of ruts and realize efficient return mode.

As shown in FIG. 3, as functional constituents related mainly to return mode, the ECU 40 has a map generating unit 41, mode switching unit 42, a cell memorizing unit 43, a cell selecting unit 44, and a travel controlling unit 45.

The map generating unit 41 generates a map of the working area AR (working area map MP) based on the working area boundary line BL identified in trace mode. Travel by trace mode is required only once after laying the boundary wire 2, and the working area map MP obtained at this time is stored in the RAM (memory) of the ECU 40.

Figure 8:
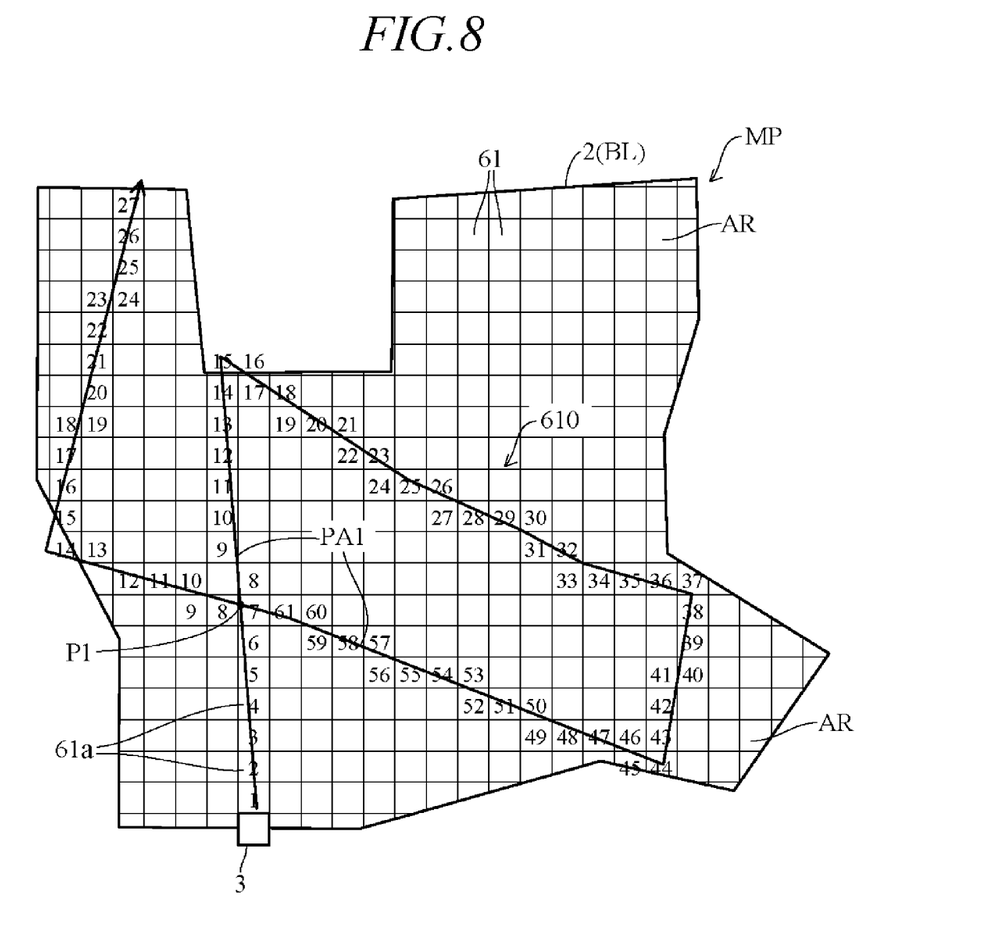
FIG. 8 is a diagram showing an example of a working area map.

FIG. 8 is a diagram showing an example of the working area map MP. The working area map MP comprises a bitmap in which multiple square cells 61 corresponding to the working area AR are arrayed.

Figure 9:
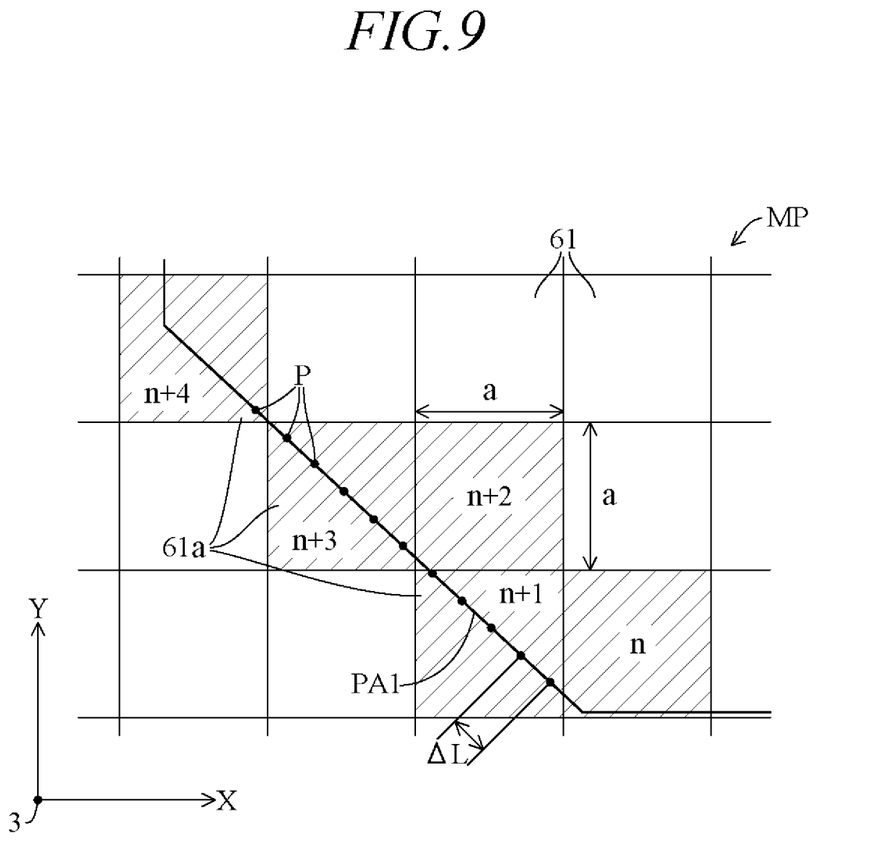
FIG. 9 is a diagram showing an enlarged view of a portion of the working area map of FIG. 8.

FIG. 9 is a diagram showing an enlarged view of a portion of the working area map MP. In FIG. 9, the working area map MP is configured by arraying the square cells 61 of predetermined side length a (e.g., 200 mm) in a grid pattern within a horizontal plane including an X axis and a Y axis (XY plane). Each cell 61 includes position data relative to a predetermined position (origin, e.g., the charging station 3). Size of the cells 61 can be varied as appropriate and can, for example, be defined to coincide with working width of the work unit 16 (maximum outer diameter of blade).

The mode switching unit 42 switches between work mode and return mode. For example, when voltage detected by the voltage sensor 58 falls to or below the predetermined value, indicating that the battery 20 requires charging, the mode switching unit 42 switches operating mode from work mode to return mode. On the other hand, when charging of the battery 20 is completed, it switches operating mode from return mode to work mode. Alternatively, the mode switching unit 42 can be configured to switch not only between work mode and return mode but also among trace mode, work mode and return mode.

The cell memorizing unit 43 identifies each of the cells 61 on the working area map MP over which the vehicle 1 passes in work mode, i.e., identifies a series of cells 61*a* as a travel locus PA1 (shown in FIG. 8). The series of cells 61*a* is hereinafter referred to as "travel locus cells". The unit 43 memorizes the identified travel locus cells 61*a* in association with sequentially assigned cell numbers n. As the vehicle 1 travels relative to the charging station 3 as an origin in work mode, cell number n of a starting cell 61 corresponding to at (or around) the location of the charging station 3 is assigned 0. Thereafter, as shown in FIG. 8, a series of the travel locus cells 61*a* are assigned cell numbers n successively incremented by 1 along the travel locus PA1.

This point will be explained in detail with reference to FIG. 9. The cell memorizing unit 43 first utilizes the output from the angular velocity sensor 52 to calculate a turning angle Δθ of the vehicle 1 with respect to a reference line (e.g., X axis) every predetermined time interval Δt (e.g., 100 ms). In addition, it utilizes outputs from the wheel speed sensors 57 to calculate a travel distance ΔL traveled by the vehicle 1 during predetermined time interval Δt. Next, it calculate the XY-plane position coordinates (X,Y) of moving point P of the vehicle 1 relative to a reference position (e.g., location of the charging station 3) at every predetermined time interval Δt based on the calculated turning angle Δθ and travel distance ΔL in equation (I) below to.

$$X = \Delta L \times \cos \Delta \theta,$$

$$Y = \Delta L \times \sin \Delta \theta \quad (I)$$

As shown in FIG. 9, the travel locus PA1 is obtained by sequentially connecting calculated moving points P with straight lines. The cell memorizing unit 43 sequentially assigns cell numbers n increased in increments of 1 (n=q, q+1, q+2, . . . ) to the travel locus cells 61*a* (hatched portions) included in the travel locus PA1 and memorizes them in memory (RAM). Namely, the cell numbers n are memorized together with position data as cell-specific data of the travel locus cells 61*a*.

Regarding this aspect, as shown at point P1 in FIG. 8, a case may arise in work mode in which two (or more) parts of the travel locus PA1 cross each other, i.e., in which two of the travel locus cells 61*a* overlap. In such a case, without incrementing the cell numbers n of the travel locus cells 61*a*, the cell memorizing unit 43 deletes all of the cell numbers n larger than an original cell number n. Travel locus cells 61*a* whose cell numbers n are deleted become just plain cells 61 not subject to memorizing by the cell memorizing unit 43. Numbering of travel locus cells 61*a* is then resumed starting from the overlapping travel locus cell 61*a*.

In the example of FIG. 8, two parts of the travel locus PA1 cross each other at point P1 on travel locus cell 61*a* with cell number n=7. Therefore, cell numbers n=8 to 61 are all deleted. This converts a part or loop 610 of travel locus cells 61*a* (group 610 of travel locus cells 61*a*) to plain cells 61 having no cell numbers n. Then, starting from the concerned one travel locus cell 61*a* with cell number n=7, the cell numbers n (=8, 9 . . . ) are assigned sequentially as shown in the left of the figure.

When the mode switching unit 42 switches operating mode from work mode to return mode, the cell selecting unit 44 takes current (concerned) one of the travel locus cells 61*a* of the vehicle 1 as a beginning point to select (from among the travel locus cells 61*a* memorized in the cell memorizing unit 43) a new series of cells of sequentially smaller cell number n. They are hereinafter referred to as "return locus cells 61*b*".

The return locus cells (i.e., the cells for return locus) 61*b* are selected from among the cells 61 around current one (crossing point) of the travel locus cells 61*a*, e.g., from among a grid of eight cells 61 adjacent to the current one of the travel locus cells 61*a* in forward, backward, leftward, rightward and diagonal directions. When two or more of the travel locus cells 61*a* are present in the grid of eight cells 61, the one with smallest cell number n is selected (more precisely the one whose cell number n is largest, but is smallest among eight is selected). A return route (hereinafter referred to as "PA2") of the vehicle 1 can be generated by connecting the return locus cells 61*b* selected in this manner with straight lines. Alternatively, the cell selecting unit 44 can select the return locus cells 61*b* from a grid of four cells adjacent to the travel locus cells 61*a* in forward, backward, leftward and rightward directions.

Figure 10:
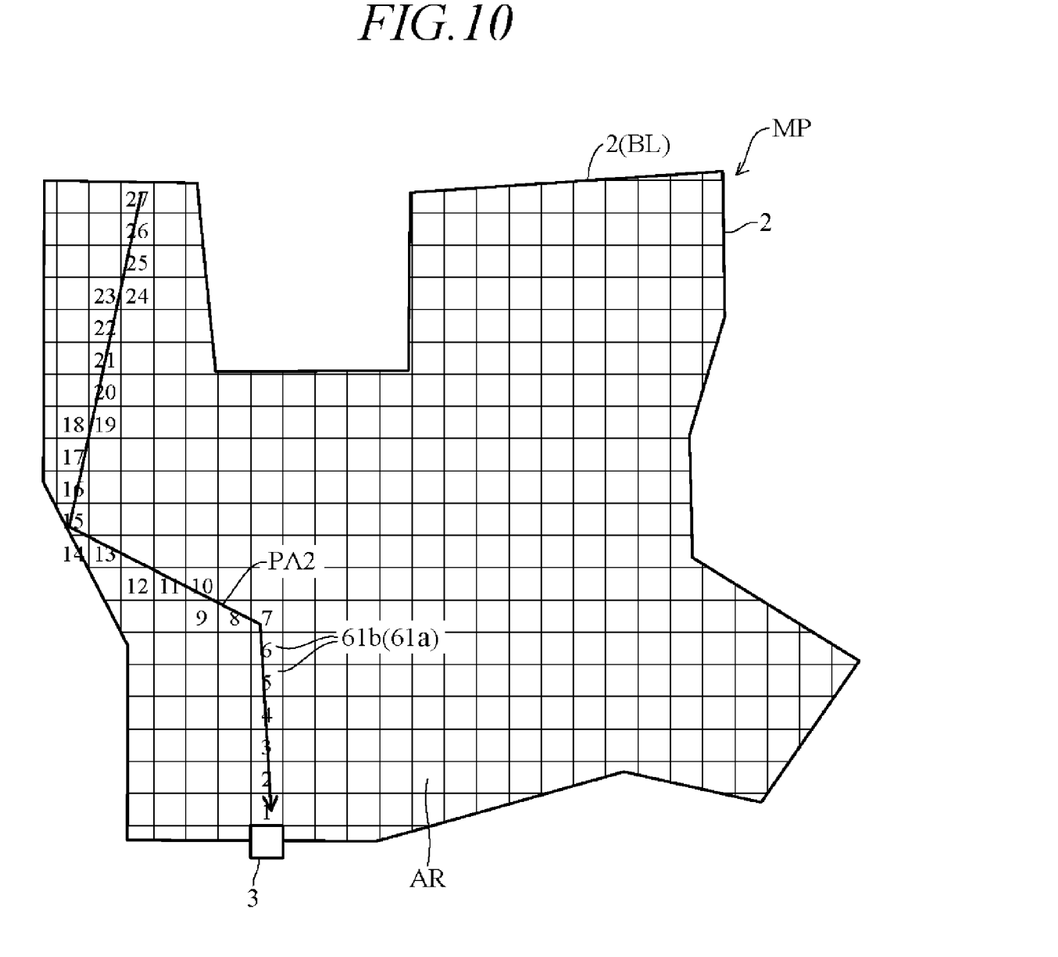
FIG. 10 is a diagram showing an example of a return route selected by a cell selecting unit of FIG. 3.

FIG. 10 is a diagram showing an example of the return route PA2. The return route PA2 shown in FIG. 10 is generated using the travel locus PA1 of FIG. 8 illustrated in the left thereof. In the example of FIG. 10, each of the travel locus cell 61*a* selected as the return locus cells 61*b* is neighbored by a single one of the travel locus cells 61*a* (not yet selected as the return locus cell 61*b*). Therefore, each of the travel locus cell 61*a* is converted as it is to the return locus cell 61*b* to enable generation of the return route PA2 by interconnecting the return locus cells 61*b* in order of selection (from larger to smaller cell number n).

The travel controlling unit 45 controls operation of the travel motors 18 by outputting control commands thereto on the basis of outputs of the angular velocity sensor 52 and wheel speed sensors 57 to make the vehicle 1 travel along the return locus cells 61*b* selected by the cell selecting unit 44. Namely, it drives the vehicle 1 toward the charging station 3 so that cell numbers n of return locus cells 61*b* passed through by the vehicle 1 decrease successively toward the starting cell whose cell number n=0. When the magnetic sensors 51 installed on the vehicle 1 enter the charger detection zone 3*a* and detect the charging station 3, the travel controlling unit 45 controls operation of the travel motors 18 so that the vehicle 1 docks with the charging station 3 to connect the terminals 22 to the terminals 33.

Figure 11:
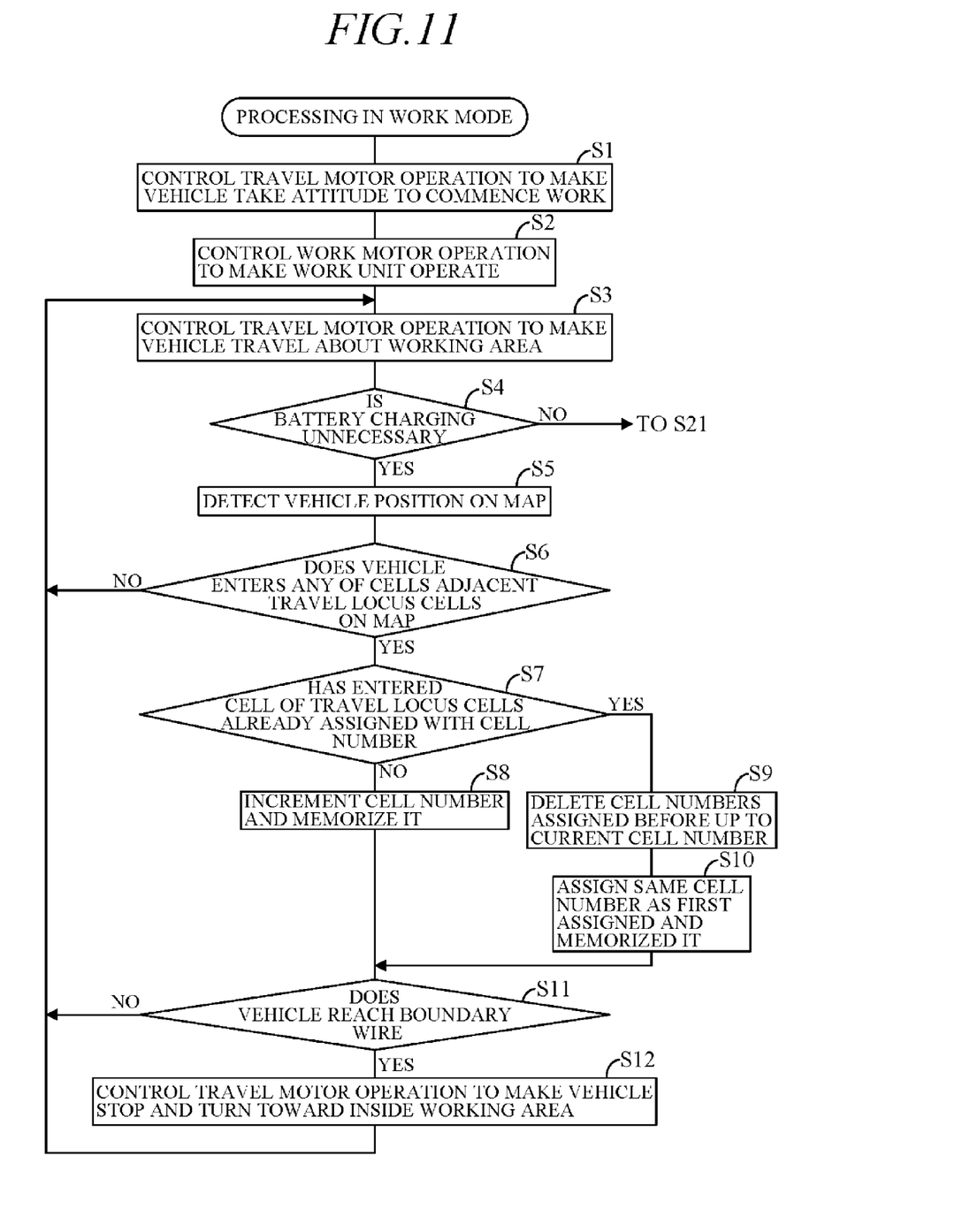
FIG. 11 is a flowchart showing processing of travel route (return route) determination in work mode.
Figure 12:
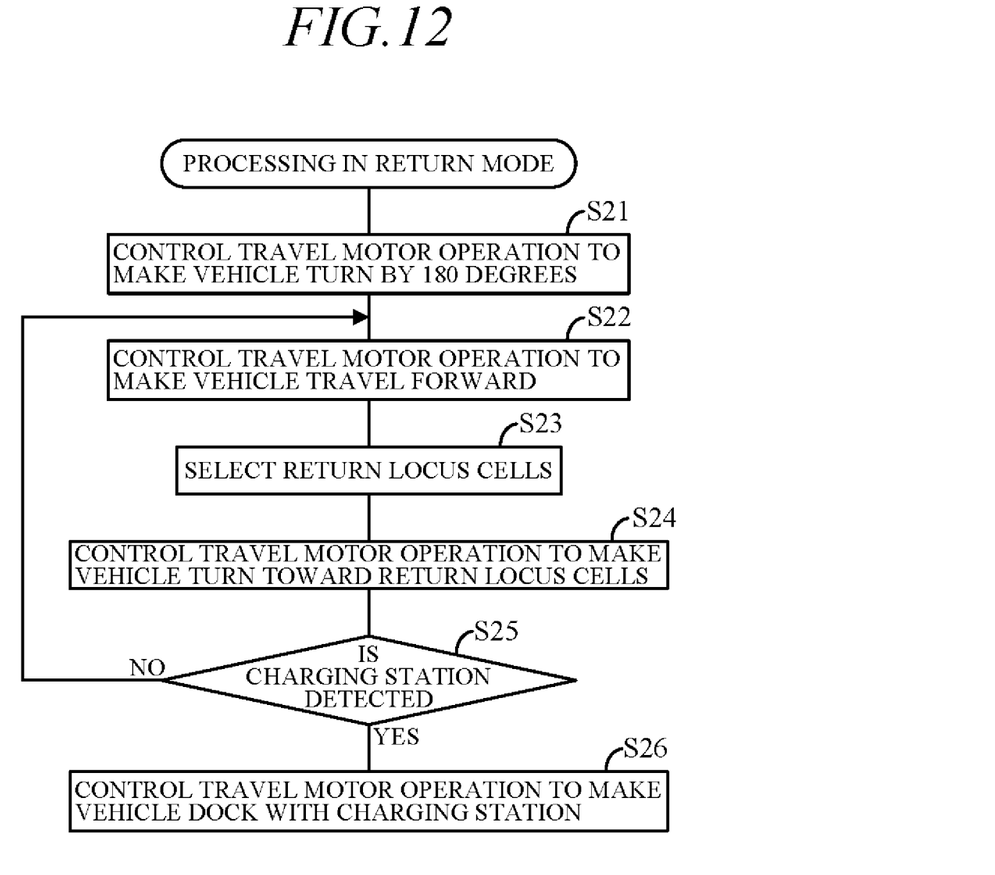
FIG. 12 is a flowchart showing processing in return mode referred to in the flowchart of FIG. 11.

Now follows a concrete explanation of processing performed in the ECU 40. FIGS. 11 and 12 are flowcharts showing an example of processing performed by the ECU 40. FIG. 11 shows an example of processing of travel route (return route) determination in work mode (work mode processing) and FIG. 12 an example of processing in return mode (return mode processing). Work mode processing is started upon completion of charging the battery 20 after docking the vehicle 1 with the charging station 3.

First, in S1, operation of the travel motors 18 is controlled by outputting control commands thereto through the motor drive drivers 18*a* to make vehicle 1 take attitude to work commencing (S: processing Step). Specifically, the vehicle 1 is controlled to back up to be disengaged from the charging station 3 and to turn toward inside the working area AR.

Next, in S2, operation of the work motor 17 is controlled by outputting control commands thereto through the work motor driver 17*a* to make the work unit 16 operate. Then, in S3, operation of the travel motors 18 is controlled by outputting control commands thereto to make the vehicle 1 travel about the working area AR randomly and autonomously to perform work.

Next, in S4, it is determined whether residual voltage of the battery 20 detected from the output of the voltage sensor 58 is equal to or greater than the predetermined value, i.e., whether charging of the battery 20 is unnecessary. When the result in S4 is YES, the program goes to S5.

In S5, the turning angle θ detected from the output of the angular velocity sensor 52 and travel distance ΔL detected from the output of the wheel speed sensors 57 are substituted into the aforesaid equations (I) to calculate the position coordinates (X,Y) of the vehicle 1, i.e., the position of the vehicle 1 is detected.

Next, in S6, it is determined whether the vehicle 1 enters any cell 61 of a plurality of series of adjacent travel locus cell 61a of the working area map MP generated in advance by the map generating unit 41 based on the position of the vehicle 1 calculated in S5. When the result in S6 is NO, the program returns back to S3 to continue the work.

On the contrary, when the result in S6 is YES, the program goes to S7, in which it is determined whether the concerned one (entered cell) of the travel locus cells 61a has already been assigned with the cell number n. When the result in S7 is NO, the program goes to S8, in which a cell number n (=q+1) is obtained by adding 1 to the largest cell number n (=q) in the memorized data up to that time, and is assigned to the concerned one as new cell data of the travel locus cells 61a. That is, the cell number n is incremented and is memorized.

On the other hand, when the result in S7 is YES, meaning that the concerned one of the travel locus cells 61a has already been assigned with the cell number n, i.e., when the vehicle 1 passes through any of overlapping travel locus cells 61a, the program goes to S9.

In S9, the already assigned cell numbers n are deleted up to the current (concerned) cell number n. Namely, the cell numbers n from the original one at the overlapping position onward are deleted. In the example of FIG. 8, the cell numbers n=7 to 61 are deleted. This means to exclude the part 610 of the travel locus cells 61a from the cell memorizing unit 43. Next, in S10, the current (concerned) one of the travel locus cells 61a is assigned the same cell number n as the original one (i.e., n=7 in the example of FIG. 8) and is memorized in memory.

Next, in S11, it is determined whether the vehicle 1 reaches the boundary wire 2 based on the output of the magnetic sensors 51. When the result in S11 is NO, the program returns back to S3. On the other hand, when the result in S11 is YES, the program goes to S12, in which operation of the travel motors 18 is controlled to make the vehicle 1 stop and turn toward inside the working area AR, whereafter the program returns to S3.

Owing to the aforesaid work mode processing, the cell numbers n of the travel locus cells 61a on the working area map MP over which the vehicle 1 passes are assigned with the cell number n and memorized in the cell memorizing unit 43 to be utilized at return mode.

In the flowchart of FIG. 11, when the result in S4 is NO, the program goes to S21 of FIG. 12 because the battery 20 requires charging.

Now follows an explanation of return mode processing shown in FIG. 12.

Return mode processing is started when residual voltage of the battery 20 detected from the output of the voltage sensor 58 falls to or below the predetermined value. Driving of the work unit 16 is stopped at this time.

First, in S21, operation of the travel motors 18 is controlled to make the vehicle 1 turn by 180 degrees. This is to first reverse the direction of the vehicle 1 in order to return it along the travel locus cells 61a. Next, in S22, operation of the travel motors 18 is controlled to make the vehicle 1 travel forward.

Next, in S23, a cell of smallest cell number n, i.e., the return locus cells 61b are selected from among a plurality of series of the travel locus cells 61a around the vehicle 1 memorized in the cell memorizing unit 43.

Next, in S24, operation of the travel motors 18 is controlled to make the vehicle 1 turn toward the selected return locus cells 61b. Then, in S25, it is determined whether the charging station 3 is detected from the output of the magnetic sensors 51, i.e., whether the vehicle 1 enters the charger detection zone 3a.

When the result in NO, the program returns to S22. On the contrast, when the result in S25 is YES, the program goes to S26, in which operation of the travel motors 18 is controlled to make the vehicle 1 commence docking operation for docking the vehicle 1 with the charging station 3 and connect the terminals 22 to the terminals 33.

Figure 13:
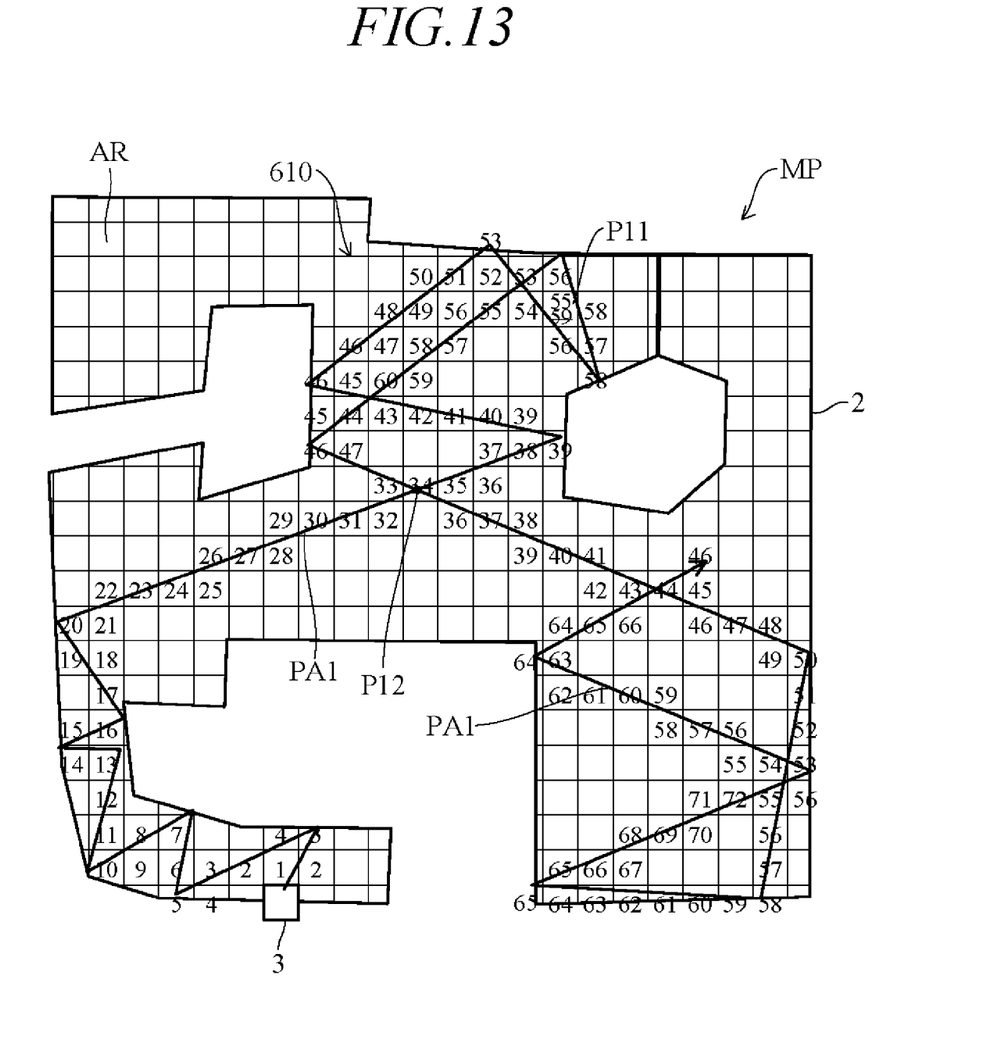
FIG. 13 is a diagram showing modification of FIG. 8.
Figure 14:
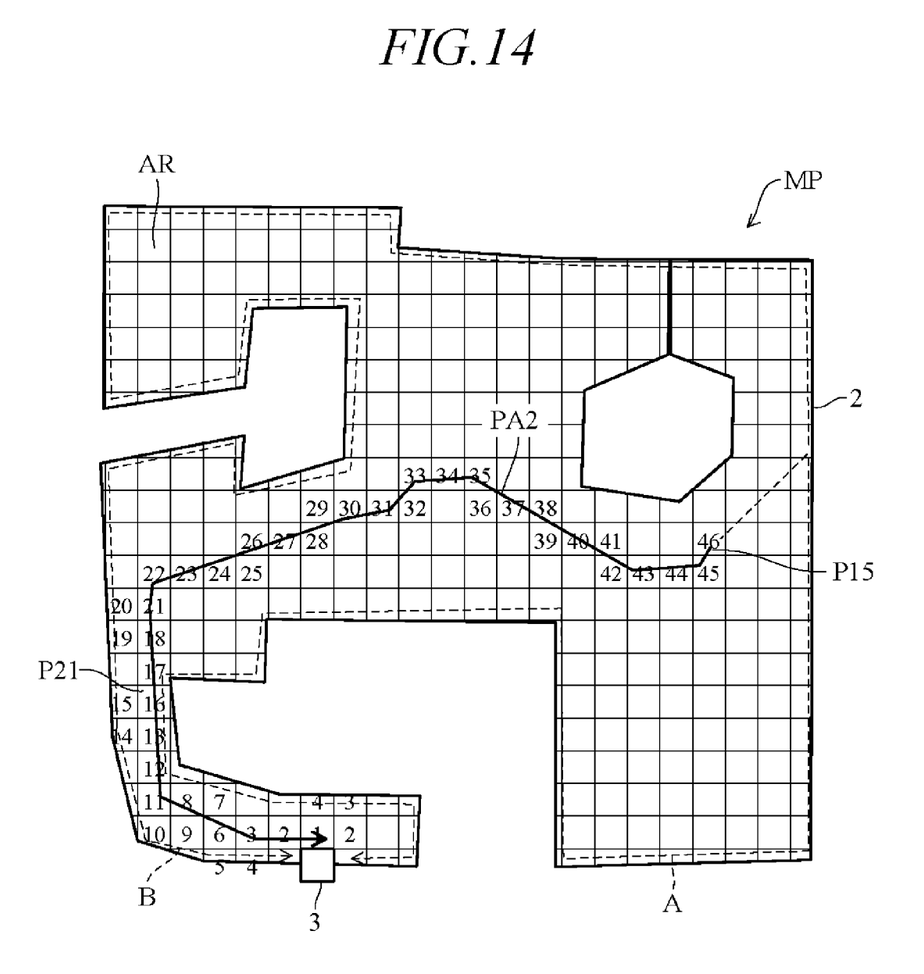
FIG. 14 is a diagram showing modifications on FIG. 10.

FIGS. 13 and 14 are modifications on FIGS. 8 and 10, respectively. FIG. 13 shows other examples of travel locus PA1 and FIG. 14 shows other example of the return route PA2.

As shown in FIG. 13, in random driving mode the vehicle 1 changes direction every time it arrives at the boundary wire 2 so as to drive forward randomly within the working area AR (S3, S12). At this time, the cell memorizing unit 43 performs processing to sequentially assign cell numbers n to each of the cells 61 on the working area map MP over which the vehicle 1 passes, i.e., the travel locus cells 61a, and stores them as cell data (S8).

When, at position P11 in FIG. 13, for example, the vehicle 1 again passes across one of the travel locus cells 61a already assigned the cell number n (=55), n=55 to 58 are deleted without incrementing the cell number n to 59 (S9). The original cell number n (=55) is then assigned to the concerned one of the travel locus cells 61a of position P11 (S10) and incrementing is resumed. Therefore, each of the travel locus cells 61a is memorized in association with a single cell number n.

On the other hand, when two parts of the travel locus PA1 intersect each other at, for example, position P12 in FIG. 13, all of the original cell number n at the intersection or crossing (=34) and later cell numbers n (=34 to 47) are deleted (S9). This converts a loop of the travel locus cells 61a assigned n=34 to 47 (part or series 610 of travel locus cells 61a) to plain cells 61 having no cell numbers n and deletes them from the cell memorizing unit 43. Also in this case, incrementing is resumed starting from the original cell number n (=34) (S10).

As shown in FIG. 14, in return mode, the cell selecting unit 44 performs processing whereby any of the return locus cells 61b of decreasing cell number n toward the starting cell whose cell number n=0 are sequentially selected from among the series of the travel locus cells 61a, and the travel controlling unit 45 performs processing whereby the vehicle 1 drives along the selected return locus cells 61b (S22, S23, S24).

For example, consider the case where at position 21 in FIG. 14 one of the return locus cells 61b of cell number n=16 is neighbored by multiple travel locus cells 61a of smaller cell number n than this of the return locus cells 61b, namely, by the travel locus cells 61a of n=13, 14, 15. In this case, the cell selecting unit 44 performs processing whereby one of the travel locus cells 61a of smallest cell number n (=13) is selected as the return locus cells 61b (S23). Therefore, the vehicle 1 does not pass across all travel locus cells 61*a* but can return to the charging station 3 by a shorter one of the return route PA2.

As stated above, the embodiment is configured to have an apparatus and method for controlling operation of an autonomously navigating utility vehicle (1) equipped with a prime mover (18) powered by a battery (20) to travel about a working area (AR) in order to perform work autonomously, comprising: a position detector (52, 57) that is configured to detect position of the vehicle on a map of the working area that is divided into an array of a plurality of cells; and an electronic control unit (ECU 40) having a CPU and memory; wherein the CPU is configured to function as: a map generating unit (41) that is configured to generate a map of the working area that is divided into an array of a plurality of cells; a mode switching unit (42) that is configured to switch operating mode between work mode for making the vehicle autonomously travel and perform work in the working area and return mode for making the vehicle return to a charging device located at the working area in order to charge the battery; a cell memorizing unit (43, S8) that is configured to identify a series of cells (61*a*) on which the vehicle has traveled in the work mode from among the plurality of cells based on the position of the vehicle detected by the position detector, assign cell numbers (n) successively to the series of cells, and memorize the series of cells in association with the assigned cell numbers, the series of cells starting from a starting cell at or around a location of the charging device to a current cell at which the position of the vehicle is detected by the position detector; a cell selecting unit (44) that is configured to successively select a cell for a return locus along which the vehicle is to move from the current cell from among the series of cells memorized by the cell memorizing unit, when the operating mode is switched from the work mode to the return mode by the mode switching unit, the cell for the return locus being adjacent to the current cell, a cell number of the cell for the return locus being smaller than a cell number of the current cell; and a travel controlling unit (45) that is configured to control operation of the prime mover to make the vehicle travel along the cell for the return locus successively selected by the cell selecting unit to return to the charging device such that the cell number of the cell for the return locus decreases as the vehicle moves.

Thus, in the present embodiment, the travel locus cells 61*a* on the map MP of the working area map MP on which the vehicle 1 travels about are memorized in association with sequentially assigned numbers, the travel locus cells 61*a* are sequentially selected from among the stored travel locus cells 61*a* so that the cell number n become smaller, and the vehicle 1 returns following the selected cells (return locus cells 61*b*). With this, for example, the vehicle 1 at position 15 in FIG. 14 returns along the return route PA2 inside the working area AR. As a result, the return path becomes short and efficient return operation can be achieved. Moreover, occurrence of ruts can be prevented because the return route PA2 constantly changes in accordance with the travel locus PA1. In contrast, when, for example, as indicated by broken line arrow A or B in FIG. 14, the vehicle 1 returns from position 15 to the charging station 3 by trace driving, the return path becomes long and time required for return operation becomes long. Moreover, ruts tend to occur owing to return by passage along the same route.

In the apparatus and method, when the vehicle travels on one of the series of cells that have already been assigned cell numbers, the cell memorizing unit deletes the cell numbers that are larger than a cell number of the one that has already been assigned cell number, and resumes assigning cell numbers starting from the cell number of the one (S9-S10).

With this, in addition to the advantages and effects mentioned above, since the part (loop) 610 of the travel locus cells 61*a* is therefore deleted when the travel locus PA1 intersect, the return locus cells 61*b* selected from the travel locus cells 61*a* have no intersection or crossing (FIGS. 10, 14). Return route PA2 can therefore be shortened and efficient return operation realized. Moreover, by deleting some of the cell numbers n, the number of travel locus cells 61*a* stored by the cell memorizing unit 43 can be reduced and memory capacity saved.

In the apparatus and method, when the series of cells memorized by the cell memorizing unit includes a plurality of cells adjacent to the current cell, the cell selecting unit selects a cell whose cell number is smallest among the plurality of cells adjacent to the current cell as the cell for return locus cell (S23).

With this, in addition to the advantages and effects mentioned above, when multiple travel locus cells 61*a* are present as the return locus cell 61*b* candidates, such as in the case of passing through a narrow area or the like (FIG. 13), efficient return operation is enabled by selecting the travel locus cells 61*a* that make the return route PA2 shortest.

In the apparatus and method, the position detector comprises an angular velocity sensor (52) that is installed on the vehicle and produces an output indicating an angular velocity occurring at the vehicle, and a travel distance detector (57) that is installed on the vehicle and produces an output indicating a travel distance of the vehicle.

With this, as this eliminates need for a high-cost position detection sensor such as a GPS sensor or geomagnetic field sensor, the apparatus can be configured overall at low cost. The travel locus PA1 of the vehicle 1 is identified and return operation of the vehicle 1 is controlled in cell units, which makes calculation of the exact position of the vehicle 1 unnecessary and enables the controller to be simply configured. The cell memorizing unit 43 memorizes the cell numbers n as attribute data of the cells 61 and the cell selecting unit 44 selects return locus cells 61*b* using the cell numbers n, thus facilitating processing by the ECU 40.

In the above the configurations of the mode switching unit 42, cell memorizing unit 43, cell selecting unit 44 and travel controlling unit 45 as well as other devices are examples and should not be interpreted to be limited to those disclosed in the embodiment.

In the above, as the orientation detector for detecting vehicle orientation, it is possible to use the angular velocity sensor 52 instead of the orientation sensor 54 or together with the orientation sensor 54.

Although the present embodiment is configured such that the vehicle 1 is driven by the prime mover comprising a pair of travel motors 18L, 18R, it may be configured such that the vehicle 1 can be driven by other prime mover such as an internal combustion engine.

It should be noted in the above that, although the present embodiment is applied for a lawn mower for lawn or grass mowing work, it may applied to any other type of utility vehicle.

While the present invention has been described with reference to the preferred embodiments thereof, it will be understood, by those skilled in the art, that various changes and modifications may be made thereto without departing from the scope of the appended claims.

What is claimed is:

1. An apparatus for controlling operation of an autonomously navigating utility vehicle equipped with a prime mover powered by a battery to travel about a working area in order to perform work autonomously, comprising:

a position detector that is configured to detect a position of the vehicle; and an electronic control unit having a CPU and memory;

wherein the CPU is configured to function as:

a map generating unit that is configured to generate a map of the working area that is divided into an array of a plurality of cells;

a mode switching unit that is configured to switch operating mode between work mode for making the vehicle autonomously travel and perform work in the working area and return mode for making the vehicle return to a charging device located at the working area in order to charge the battery;

a cell memorizing unit that is configured to identify a series of cells on which the vehicle has traveled in the work mode from among the plurality of cells based on the position of the vehicle detected by the position detector, assign cell numbers successively to the series of cells, and memorize the series of cells in association with the assigned cell numbers, the series of cells starting from a starting cell at or around a location of the charging device to a current cell at which the position of the vehicle is detected by the position detector;

a cell selecting unit that is configured to successively select a cell for a return locus along which the vehicle is to move from the current cell from among the series of cells memorized by the cell memorizing unit, when the operating mode is switched from the work mode to the return mode by the mode switching unit, the cell for the return locus being adjacent to the current cell, a cell number of the cell for the return locus being smaller than a cell number of the current cell; and a travel controlling unit that is configured to control operation of the prime mover to make the vehicle travel along the cell for the return locus successively selected by the cell selecting unit to return to the charging device such that the cell number of the cell for the return locus decreases as the vehicle moves.

2. The apparatus according to claim 1, wherein, when the vehicle travels on one of the series of cells that has already been assigned a cell number, the cell memorizing unit deletes the cell numbers that are larger than the cell number of the one of the series of cells that has already been assigned the cell number, and resumes assigning cell numbers starting from the cell number of the one of the series of cells that has already been assigned the cell number.

3. The apparatus according to claim 1, wherein, when the series of cells memorized by the cell memorizing unit includes a plurality of cells adjacent to the current cell, the cell selecting unit selects a cell whose cell number is smallest among the plurality of cells adjacent to the current cell as the cell for the return locus.

4. The apparatus according to claim 1, wherein the position detector comprises an angular velocity sensor that is installed on the vehicle and produces an output indicating an angular velocity occurring at the vehicle, and wheel speed sensors installed on the vehicle and produce output indicating a travel distance of the vehicle.

5. A method for controlling operation of an autonomously navigating utility vehicle equipped with a prime mover powered by a battery to travel about a working area in order to perform work autonomously, comprising the steps of:

detecting a position of the vehicle;

generating, at an Electronic Control Unit (ECU), a map of the working area that is divided into an array of a plurality of cells;

switching, at the ECU, operating mode between work mode for making the vehicle autonomously travel and perform work in the working area and return mode for making the vehicle return to a charging device located at the working area in order to charge the battery;

identifying, at the ECU, a series of cells on which the vehicle has traveled in the work mode from among the plurality of cells based on the position of the vehicle detected in the step of detecting, the series of cells starting from a starting cell at or around a location of the charging device to a current cell at which the position of the vehicle is detected in the step of detecting;

assigning, at the ECU, cell numbers successively to the series of cells;

memorizing, at the ECU, the series of cells in association with the assigned cell numbers;

successively selecting, at the ECU, a cell for a return locus along which the vehicle is to move to return from the current cell from among the series of cells memorized in the step of memorizing, when the operating mode is switched from the work mode to the return mode in the step of switching, the cell for the return locus being adjacent to the current cell, a cell number of the cell for the return locus being smaller than a cell number of the current cell; and controlling, at the ECU, operation of the prime mover to make the vehicle travel along the cell for the return locus selected in the step of selecting to return to the charging device such that the cell number of the cell for the return locus decreases as the vehicle moves.

6. The method according to claim 5, wherein, when the vehicle travels on one of the series of cells that has already been assigned a cell number, the step of memorizing includes deleting the cell numbers that are larger than the cell number of the one of the series of cells that has already been assigned the cell number, and the step of assigning includes resuming assigning cell numbers starting from the cell number of the one of the series of cells that has already been assigned the cell number.

7. The method according to claim 5, wherein, when the series of cells memorized in the step of memorizing includes a plurality of cells adjacent to the current cell, the step of selecting includes selecting a cell whose cell number is smallest among the plurality of cells adjacent to the current cell as the cell for the return locus.

8. The method according to claim 5, wherein the step of detecting comprises the steps of detecting an angular velocity occurring at the vehicle, and detecting a travel distance of the vehicle.

* * * * *